No. 757,337. Patented April 12, 1904.

UNITED STATES PATENT OFFICE.

ANTON NETTL, OF PRAGUE, AUSTRIA-HUNGARY.

PROCESS OF MAKING ADHESIVES.

SPECIFICATION forming part of Letters Patent No. 757,337, dated April 12, 1904.

Application filed June 17, 1903. Serial No. 161,948. (No specimens.)

*To all whom it may concern:*

Be it known that I, ANTON NETTL, doctor of philosophy, and a subject of the Emperor of Austria-Hungary, residing at 28 Mariengasse, in the city of Prague, Kingdom of Bohemia, and Empire of Austria-Hungary, have invented a certain new and useful Process of Manufacturing a Water-Soluble Adhesive and Agglutinant which Allows Mixing with Proteids without Formation of a Deposit, of which the following is a specification.

This invention has reference to a process for the manufacture of an adhesive from the spent liquors resulting from the manufacture of sulfite fiber, and it is distinguished from the processes heretofore in use by the possibility of utilizing by this process the entire amount of the organic substances contained in the said sulfite liquors for the purpose of manufacturing an adhesive which is readily soluble in water, while in the processes heretofore employed for the utilization of spent liquors of this kind only about the fourth part of the organic substance could be obtained in form of an adhesive, which besides was insoluble in water.

My process consists, chiefly, in first removing from the spent sulfite liquor the sulfurous acids and its salts contained in the liquor and then after the removal or destruction of the sulfurous acid and its salts treating the remaining liquid with an oxidizing and hydrolyzing substance, and preferably with the salts of chloric acid, from which the acid is liberated by the addition of other suitable acids. By this treatment the tannic acid contained in the spent liquor and which forms the well-known insoluble precipitate with glue solutions is converted into gallic acid and into sugar, and upon prolonged boiling it is changed into tannoxyl acid and into tannomelanic acid, whereby it becomes possible to mix the sulfite liquor, the properties of which have been changed in this manner, with glue and proteid substances without producing the precipitate otherwise produced by tannic acid and its salts and which is insoluble in water. Besides, the adhesive properties are increased by the destruction of the tannic acid and of its salts which is brought about by my process, and I am thus enabled by proceeding in this manner to utilize the total amount of the organic substance of the spent liquor for the manufacture of an adhesive.

The removal or the destruction of the sulfurous acid in the first stages of the process may be effected in any suitable manner—by boiling, for instance, or by the addition of oxidizing agents and by the introduction of air, if desired, or of steam or of other agents of this kind, whereby the salts of the sulfurous acid are also precipitated at the same time and are removed; but it must be understood that I may use any other suitable processes for the removal and for the destruction of the sulfurous acid and of its salts, according to the conditions of the particular case. After the sulfurous acid and its salts have been removed I add to the resulting liquid the hydrolyzing or oxidizing agent for effecting the conversion and decomposition—for instance, chlorate of potash and chlorate of sodium—and preferably in a proportion in excess to the amount of tannin in the liquor, and an amount of some mineral acid—of sulfuric acid, for instance—which quantity is governed by the amount of the hydrolyzing or oxidizing agent employed. Thus in the case of a liquor which after the separation or the destruction of the sulfurous acid and of the sulfites shows a percentage of about one to five per cent. of tannic acid I may, for instance, use one to five pounds of chlorate of potash for each one hundred (100) gallons of liquid, according to the concentration of the same, and about two to ten gallons of sulfuric acid of, say, 1.55 specific gravity; but it is evident that these proportions may be varied without deviating from the spirit of my invention. The mixture obtained is then heated in digesters and, if desired, under pressure and at a rather high temperature until the violent reaction which occurs during the boiling process is over, the liquid boiling without foam, and until a special test taken from the liquid shows the tannic acid previously existing therein to have been completely destroyed and to be converted into gallic acid and sugar, which can be easily ascertained by the addition of a solution of albumen or of glue. As soon as this point has been reached the cooking process is further continued until the gallic acid has been converted into tannoxyl and into tanno-melanic acid and until the liquid, which previously showed a dark-brown dirty color, has assumed a beautiful light yellow-red color, which appears especially in thick layers and which indicates the termination of the process. In case the liquid should have assumed an acid reaction when the treatment is finished the acid is cautiously taken off by the addition of a suitable agent in the well-known manner, and the liquid may then be filtered, if desired, from any deposit that may have formed. The thus-obtained liquid is treated while still hot with an aqueous solution of from ten to thirty per cent. of hide-glue or bone-glue or with some other solution of a proteid substance. Thus I may use, for instance, for every hundred gallons of the liquid showing, for instance, a density of 25° Baumé an addition of from ten to thirty gallons of a ten-per-cent. solution of animal glue. The thus-obtained mixture of liquids is then evaporated down to a very great concentration—for instance, so as to show a specific gravity of, say, 40° Baumé—which may be effected with preference in a vacuum apparatus. No deposit takes place in this evaporating process, and a homogeneous non-putrefying mass of superior agglutinating properties and which is readily soluble in water is produced.

Instead of animal glue or in admixture with such substances as glue I may also add to the spent sulfite liquor after it has been treated according to my above-described process five to twenty per cent. or more of some vegetable kind of glue—such, for instance, as *Gelidium amansii*—or of some other suitable natural or artificial product capable of forming an abundance of jelly.

After the addition of the glue or of glue-like materials I may also dry the preparation obtained in a well-known manner—for instance, by superheated steam-cylinders—and then grind the dry product.

I am aware that it is old to treat spent sulfite liquors from the manufacture of cellulose with chlorates in order to destroy the sulfurous acid by oxidation; but my invention is distinguished therefrom by the fact that in my process the tannic acid is destroyed, whereupon protein substances may be added to the liquor without causing a precipitate, and in this manner I am enabled to produce a superior water-soluble adhesive agent.

What I claim, and desire to secure by Letters Patent of the United States, is—

1. The process of manufacturing a water-soluble adhesive agent from the spent sulfite liquors resulting in the manufacture of cellulose, which consists in first removing sulfurous acid and its salts, then boiling the liquid with some chlorate and with an acid, until the tannic acid originally contained in the liquid has become converted into gallic acid and into sugar, then continuing the boiling or cooking process in the presence of oxidants, until the gallic acid has been converted into tannoxyl and tanno-melanic acid and until the solution has assumed a lighter color, and then adding to the still hot solution a solution of glue-like substances.

2. The process of manufacturing a water-soluble adhesive agent from the spent sulfite liquors, resulting in the manufacture of cellulose, which process consists in removing and destroying the sulfurous acid and the sulfites present, filtering the liquid and then boiling or cooking the liquid obtained with some chlorate and with acid under pressure until the tannic acid, originally present in the liquid has been destroyed and then continuing the boiling or cooking process, until the dark-colored liquid has assumed a light yellow-red color, substantially as described, and then neutralizing the liquid, then separating the liquid from any deposits formed, then adding to the liquid an aqueous solution of glue from any suitable source, then reducing the liquid to the desired consistency and body, and reducing the residue to powder.

In witness whereof I have hereunto set my hand in presence of two witnesses.

ANTON NETTL.

Witnesses:
 ADOLPH FISCHER,
 ARTHUR SCHWEZ.